May 28, 1940.    C. D. RYDER    2,202,269
OVERFEED DEVICE
Filed Aug. 9, 1937    2 Sheets-Sheet 1

Inventor
CHARLES DANIEL RYDER,
Attorneys

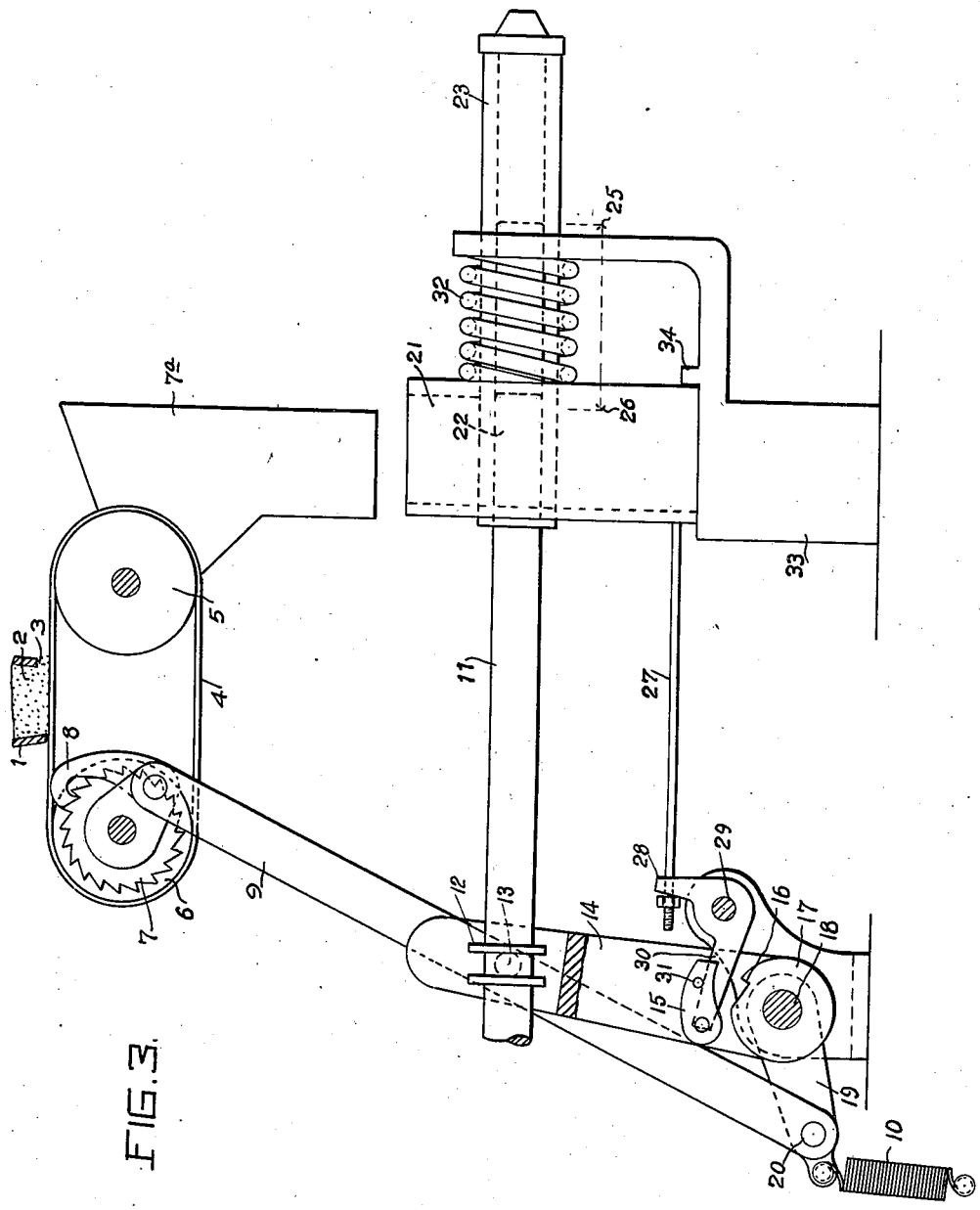

Patented May 28, 1940

2,202,269

UNITED STATES PATENT OFFICE 2,202,269

OVERFEED DEVICE

Charles Daniel Ryder, Covington, Ky., assignor to The Grotelite Company, Bellevue, Ky., a corporation of Kentucky Application August 9, 1937, Serial No. 158,113

5 Claims. (Cl. 18—30)

It is an object of this invention to provide a machine for automatically regulating the amount of thermoplastic material or any other similar materials which are fed from a hopper or container to an injection chamber. However, this invention is of general utility other than for the specific purpose of feeding predetermined charges of thermoplastic materials to an injection chamber.

It is an object to provide means for automatically compensating for variations in material itself after the first adjustment is made of the quantity of material necessary for a given injection. It has been found impossible to provide the exact amount of material required to properly fill the mold each time the injection plunger makes a stroke. This method has a serious disadvantage in that the recurring, minute depletions in the charge result in spoiled work.

The object of this invention is to avoid the possibility of the charge depletion. There is fed slightly more material each stroke of the injection plunger than is necessary to fill the mold. This results in an accumulation of material in the injection chamber, which in turn gradually shortens the stroke of the injection plunger, ultimately stalling it.

It is therefore an object of this invention to provide a method of operation in an apparatus by which the amount of surplus material accumulated in the injection chamber has shortened the stroke of the injection plunger to a predetermined point, and means are provided to operate a clutch or trip which causes a charge to be withheld. By withholding this single charge, the plunger is able to clear the injection chamber of its accumulated surplus. Thereafter the cycle starts again.

Referring to the drawings:

Figure 3 is a detail view of the position of the mechanism utilized to render the feeding mechanism inoperative during a stroke of the plunger.

Figure 1:
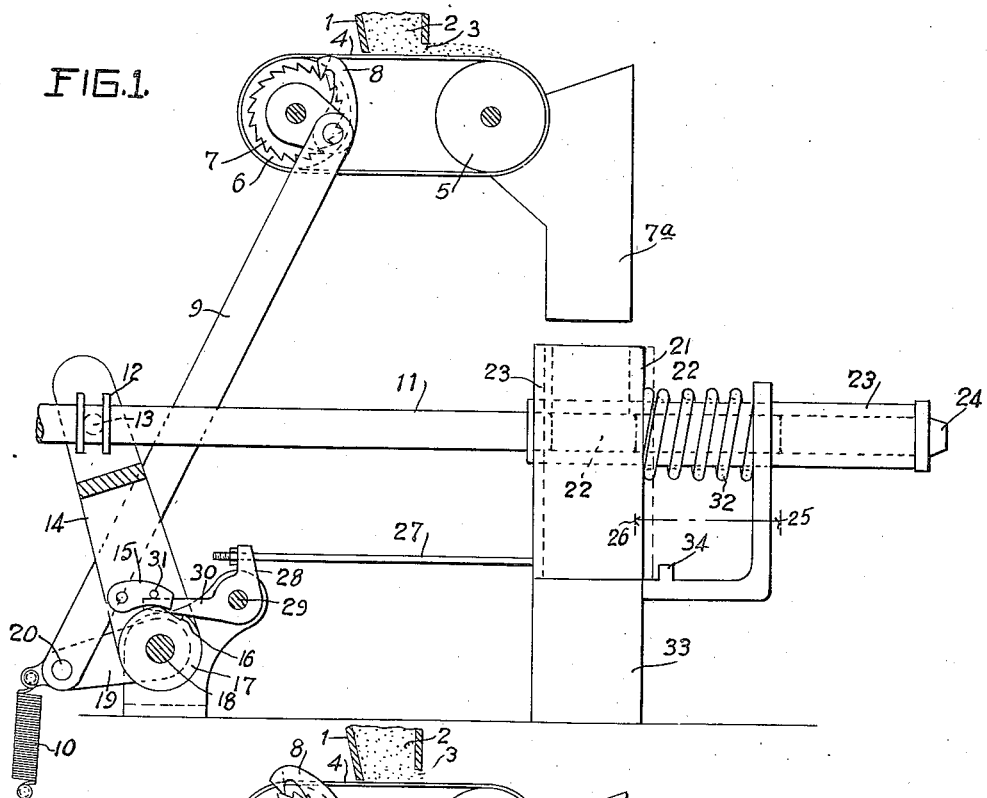
Figure 1 is a diagrammatic view of the beginning of a feeding operation as evidenced by the position of the mechanism.
Figure 2:
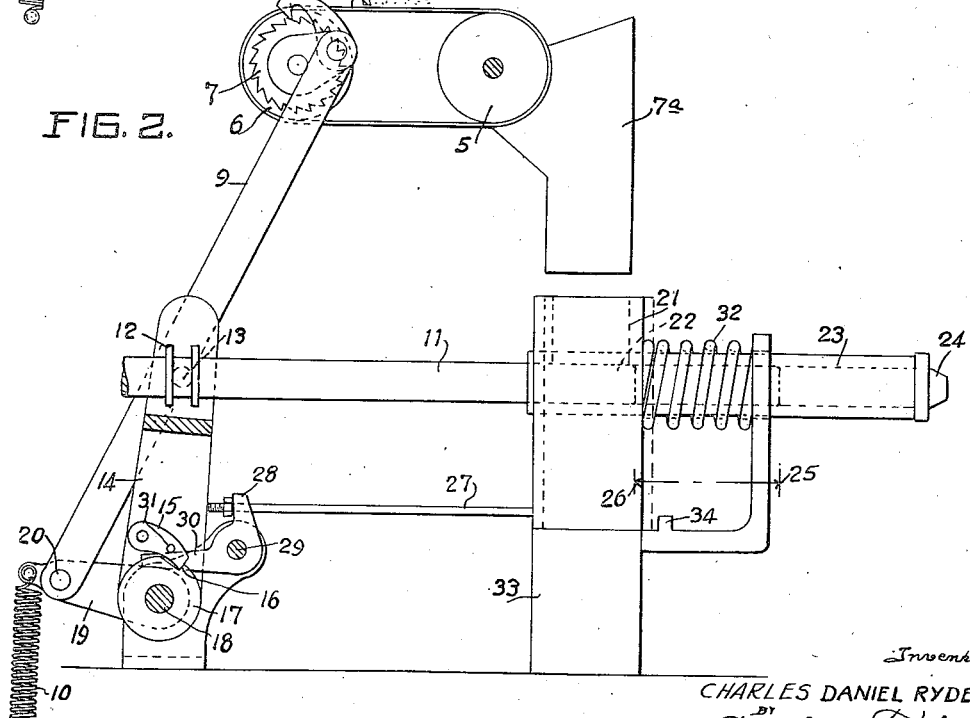
Figure 2 is a similar view of the position of the parts at the end of the stroke of the feeding mechanism.

Referring to the drawings in detail, 1 is a hopper containing thermoplastic material 2. The bottom of the hopper is open so that its contents may pass to the right and through the opening 3 on the belt 4 which is mounted upon the pulleys 5 and 6. The material from this belt is dumped into the hopper 7a which may be made adjustable with respect to the belt 4. The amount of material passing through the opening 3 can be adjusted as desired. This belt 4 is moved through actuating the pulley 6 which has a ratchet 7 engaged by the pawl 8 on the connecting rod 9.

This connecting rod is actuated in one direction, that is downwardly, for feeding purposes by the spring 10. This connecting rod 9 is actuated in the other direction as follows: the plunger 11 is reciprocated by any desired prime mover such as a hydraulic cylinder and piston. As it reciprocates it actuates the collars 12 between which is inserted the pin 13 on the feed lever 14. The feed lever 14 carries the pawl 15 that is adapted to engage with the tooth 16 on the ratchet clutch disc 17 that is fixed to the shaft 18 which in turn carries the arm 19 that is pivoted at 20 to the connecting rod 9.

Thus when the feed lever moves forwardly the pawl 15 engages the tooth 16 which results in moving the connecting rod 9 upwardly to put its pawl 8 in position to engage with the ratchet 7 so that the spring 10 will be able to actuate the ratchet 7 and move the belt 4 to a feeding position. This feeds a given amount of thermoplastic material into the hopper 7a.

Thus successive increments of thermoplastic material are fed into the receiving and heating chamber. From it is delivered the charged material into the receiving space 22 of the rear end of the sliding injection chamber 23 having an injection nozle 24. This chamber is mounted in the heating chamber 21 and travels with it as indicated by the dotted lines.

The material as it is fed by the reciprocations of the plunger accumulates between the points marked 25 and 26. 25 indicates the maximum plunger travel. The movement of the sliding injection chamber and the moving heating chamber is indicated by the dotted lines. This chamber is connected to a rod 27 which is connected at its free end to an arm 28 of a bell crank pivoted at 29 and having at its other end an arm 30 which is adapted to engage the pin 31 on the pawl 15 to lift the pawl so it will not engage with the tooth 16 when it is necessary to omit temporarily the feeding of material to the injection chamber because of an over-accumulation until the over-accumulation has been discharged, wholly or partially, through the injection nozzle 24. This reciprocating chamber 21 and its sliding injection chamber are normally held in their original position by the spring 32. The chamber itself rests upon the support 33 and is limited in its movement by the shoulder 34 thereon.

It will be understood that the drawing, for the purposes of clarity, is diagrammatic as the exact details of the mechanism are not important. For instance, the heating mechanism for the heating chamber 21 is omitted.

Method of operation

The object of the invention is to avoid the possibility of charge depletion. Therefore, at each stroke of the injection plunger 11 slightly more material is fed than is necessary to fill a mold into which the material is injected through the nozzle 24. This results in an accumulation of the material in the injection chamber in the space between the points marked 25 and 26.

When the amount of surplus material accumulating in the injection chamber has shortened the stroke of the injection plunger 11 to the predetermined point 26, this results in overcoming the spring 32 and the moving of the heating chamber 21 and the sliding injection chamber 23 to dotted line position with the result that the pawl 15 is lifted by the arm 30 under the pin 31 and the movement of the plunger 11 can continue in its injecting operation to clear the injection chamber of its surplus without intermittently continuing the feeding of additional thermoplastic material. By withholding a single charge the plunger is able to clear the injection chamber of the accumulated surplus and the cycle starts over again.

Of course, an initial adjustment for quantity is made and what has been described is an additional means for automatically compensating for variations in the material itself after the first adjustment is made.

While it is true that the heating chamber 21 is moved forward on its guide 33, against the spring pressure of the spring 32, at each stroke of the plunger 11 due to the resistance encountered by the plunger on the injection stroke, yet this resistance, and the consequential movement, begins when the last incoming charge is compressed tightly against the preceding charge and lasts until the completion of the forward stroke. Upon the return of the plunger, the heating chamber 21 is forced back to its normal position by the spring pressure as described. This movement of the heating chamber 21 operates the pawl lifter 30, but the operations are so timed that until such material has accumulated in the heating chamber the forward movement of 21 and the lifting of the pawl 15 are too late to trip the ratchet clutch disc 17 or interfere with the operation of the pawl 15 on the tooth 16 of this clutch disc 17 so the feeding operation continues until the over-accumulation has become serious.

When the heating chamber has become filled with the accumulated surplus, the forward movement occurs so early that the pawl 15 is lifted early enough to disengage the shoulder 16 and one complete charge is withheld.

From the foregoing it will be seen that the heating chamber 21 must carry enough material, at the time of tripping the pawl 15, to fill the mold at least twice. Under certain conditions this will not be possible because of the quantity of material involved. To meet this requirement provision must be made to withold only part of a complete charge. Preferably, there is provided with the mechanism a visual indicator to enable the operator to determine exactly when the plunger ceases its forward movement. By marking this point, as the next forward movement must not quite reach this point, it is possible to insure that a proper surplus is being fed. A suitable manual adjusting means is provided to permit the amount to be increased or decreased while the machine is in operation.

It should be understood that the resistance to the plunger travel sufficient to operate the mechanism is encountered when the plunger has packed the last loose charge tight against the preceding charge. This is before the injection stroke proper.

When the plunger has filled the mold and no more material can be expelled, the plunger is stalled despite the heavy hydraulic pressure forcing it forward. This, and the fact that the stalling point varies in accordance with the accumulated surplus, makes possible the operation of the over feed system.

This method further consists of the step of feeding increments of material to be extruded, such increments being slightly surplus or over what is to be required in each increment; the forcing of each increment into compact relationship in a movable injection chamber or container; and upon the accumulation of a given amount of surplus in the container of rendering further feeding inoperative until the surplus contents of the container has been substantially ejected from the container by an extrusion operation; and utilizing the resistance to the extrusion of the contents of the container by reason of said surplus to control rendering further feeding inoperative until the surplus has been disposed of by final ejection, whereby there is always insured an overage of material to be injected to insure complete filling of a mold upon each injection stroke.

It will be understood that it is desired to comprehend within this invention such modifications as come within the scope of the claims and the invention.

Having thus fully described my invention, what I claim as new and desire to secure by Letters Patent, is:

1. In combination, a feeding member, a material holder adapted to supply plastic material thereto, a reciprocating heating chamber, means to guide material from said feeding member to said heating chamber, a sliding injector chamber reciprocating with said heating chamber, yielding means for resisting the movement of said chambers, a plunger reciprocating within said chambers, an intermittent connecting means operatively interconnecting said plunger and said feeding member and means responsive to a predetermined motion of said plunger for moving the feeding member a predetermined amount for feeding a predetermined amount of plastic material, said interconnecting means comprising a connecting rod, a ratchet and pawl mechanism between said rod and said feeding member, a feeding lever connected to said plunger, a second ratchet and pawl mechanism between said feed lever and said connecting rod, and means associated with said chambers for rendering said second ratchet and pawl mechanism between said feed lever and said connecting rod inoperative in response to an excess accumulation of material within said chambers moving said chambers beyond a predetermined point when the material is engaged by said plunger.

2. In combination, a material holder, a slidable injection chamber, a material injector movable in said chamber, a material feeder for feeding material from said material holder to said injection chamber, means responsive to the movement of said injector for actuating said material feeder, said injection chamber being slidable in response to the accumulation of a predetermined surplus of material therein, and mechanism responsive to a predetermined sliding of said injection chamber for rendering said feeder-actuating mechanism temporarily inoperative during the existence of said surplus whereby to temporarily immobilize said material feeder while effecting continued strokes of said injector to use up said surplus in said injection chamber.

3. In combination, a material holder, a slidable injection chamber, a material injector movable in said chamber, a material feeder for feeding material from said material holder to said injection chamber, means including a pawl and ratchet interposed between said injector and said material feeder responsive to the movement of said injector for actuating said material feeder, said injection chamber being slidable in response to the accumulation of a predetermined surplus of material therein, and mechanism responsive to a predetermined sliding of said injection chamber for rendering said feeder-actuating mechanism temporarily inoperative during the existence of said surplus whereby to temporarily immobilize said material feeder while effecting continued strokes of said injector to use up said surplus in said injection chamber.

4. In combination, a material holder, a slidable injection chamber, a material injector movable in said chamber, a material feeder for feeding material from said material holder to said injection chamber, means including a pawl and ratchet interposed between said injector and said material feeder responsive to the movement of said injector for actuating said material feeder, said injection chamber being slidable in response to the accumulation of a predetermined surplus of material therein, and mechanism responsive to a predetermined sliding of said injection chamber for holding said pawl out of engagement with said ratchet and thereby rendering said feeder-actuating mechanism temporarily inoperative during the existence of said surplus whereby to temporarily immobilize said material feeder while effecting continued strokes of said injector to use up said surplus in said injection chamber.

5. In combination, a material holder for holding a supply of plastic materials, a slidable receiving chamber, means for feeding said materials step by step from said holder by gravity in increments to said receiving chamber, a material injector in said chamber, means for slidably supporting said chamber, means responsive to the movement of said injector for effecting the step by step movement of said feeding means, and means responsive to a predetermined movement of said slidable receiving chamber for rendering the step by step movement of said feeding means temporarily inoperative for a given cycle of movement.

C. DANIEL RYDER.